(12) United States Patent
Yoshiyasu

(10) Patent No.: US 11,396,590 B2
(45) Date of Patent: Jul. 26, 2022

(54) PNEUMATIC TIRE

(71) Applicant: SUMITOMO RUBBER INDUSTRIES, LTD., Kobe (JP)

(72) Inventor: Hayato Yoshiyasu, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 171 days.

(21) Appl. No.: 16/498,636

(22) PCT Filed: Apr. 13, 2018

(86) PCT No.: PCT/JP2018/015569
§ 371 (c)(1),
(2) Date: Sep. 27, 2019

(87) PCT Pub. No.: WO2018/190430
PCT Pub. Date: Oct. 18, 2018

(65) Prior Publication Data
US 2020/0102448 A1  Apr. 2, 2020

(30) Foreign Application Priority Data
Apr. 14, 2017 (JP) .............................. JP2017-080970

(51) Int. Cl.
*C08L 9/06* (2006.01)
*B60C 1/00* (2006.01)
*B60C 11/00* (2006.01)
*C08K 3/36* (2006.01)
*C08K 5/3477* (2006.01)
*C08L 9/00* (2006.01)
*C08L 25/04* (2006.01)

(52) U.S. Cl.
CPC .............. *C08L 9/06* (2013.01); *B60C 1/0016* (2013.01); *B60C 11/0008* (2013.01); *C08K 3/36* (2013.01); *C08K 5/3477* (2013.01); *C08L 9/00* (2013.01); *C08L 25/04* (2013.01); *C08L 2205/025* (2013.01)

(58) Field of Classification Search
CPC ........... C08K 5/3477; C08K 3/36; C08L 9/06; C08L 25/04
See application file for complete search history.

(56) References Cited

U.S. PATENT DOCUMENTS

| 4,835,063 A | 5/1989 | Jadamus et al. |
| 5,877,249 A * | 3/1999 | Lambotte .................. C08L 9/00 524/493 |
| 8,653,195 B2 * | 2/2014 | Blok ........................ C08L 47/00 525/191 |
| 2004/0122157 A1 * | 6/2004 | Labauze .................. C08L 9/00 524/487 |
| 2013/0274404 A1 | 10/2013 | Vasseur et al. |
| 2016/0340446 A1 | 11/2016 | Takahashi et al. |
| 2017/0121490 A1 * | 5/2017 | Miyazaki ................. C08K 3/04 |
| 2017/0145195 A1 * | 5/2017 | Isitman ..................... C08L 9/00 |
| 2018/0186979 A1 * | 7/2018 | Labrunie ................ C08L 65/00 |
| 2018/0273723 A1 | 9/2018 | Sato et al. |
| 2020/0024432 A1 * | 1/2020 | Kitaura .................... C08L 45/00 |
| 2020/0048437 A1 * | 2/2020 | Yoshiyasu ................ C08L 7/00 |

FOREIGN PATENT DOCUMENTS

| CN | 102108141 A | 6/2011 | |
| JP | 63-114641 A | 5/1988 | |
| JP | 2013-544936 A | 12/2013 | |
| JP | 2014-173062 A | 9/2014 | |
| JP | 2015-163681 A | 9/2015 | |
| WO | WO 2011/158509 A1 | 12/2011 | |
| WO | WO-2011158509 A1 * | 12/2011 | ............. C08L 91/00 |
| WO | WO 2014/021002 A1 | 2/2014 | |
| WO | WO 2017/057758 A1 | 4/2017 | |
| WO | WO-2018164246 A1 * | 9/2018 | ............... B60C 1/00 |

OTHER PUBLICATIONS

Google patents translation of WO 2011158509 (2011, 11 pages).*
Total (ClearTack W100, Total, 2019, 1 page).*
Universal Selector (Sprintan SLR 4630-SCHKOPAU Technical Data Sheet, Universal Selector, 2019, 3 pages).*
Rutgers (Novares C 30 Technical Information, Rutgers, 2010, 1 page).*
Global Sites (SBR RC2257S Product Information, 2020, 2 pages).*
Machine translation of WO 2018164246 (2018, 13 pages).*
English translation of JP-2014-173062-A (Publication date Sep. 22, 2014).
English translation of WO-2011/158509-A1 (Publication date Dec. 22, 2011).
English translation of WO-2014/021002-A1 (Publication date Feb. 6, 2014).
International Search Report, issued in PCT/JP2018/015569, dated Jul. 10, 2018.
Written Opinion of the International Searching Authority, issued in PCT/JP2018/015569, dated Jul. 10, 2018.

* cited by examiner

*Primary Examiner* — Brieann R Johnston
(74) *Attorney, Agent, or Firm* — Birch, Stewart, Kolasch & Birch, LLP

(57) ABSTRACT

The present invention provides a pneumatic tire achieving a balanced improvement in fuel economy, abrasion resistance, and wet grip performance. The present invention relates to a pneumatic tire, including a tread containing a tread rubber composition, the tread rubber composition containing a rubber component including 30% by mass or more of a styrene-butadiene rubber, the tread rubber composition containing, per 100 parts by mass of the rubber component: 80 to 150 parts by mass of silica; 0.1 to 3.0 parts by mass of a tetrazine compound of formula (1); and 50 parts by mass or less of a hydrocarbon resin having a SP value of 7.5 to 10.5, the styrene-butadiene rubber having a styrene content of 23% by mass or higher.

5 Claims, No Drawings

PNEUMATIC TIRE

TECHNICAL FIELD

The present invention relates to a pneumatic tire.

BACKGROUND ART

In recent years, there has been a growing trend to use silica rather than carbon black to provide good fuel economy to rubber compositions for tire treads, and the amount of silica incorporated has also been increasing (for example, Patent Literature 1). However, because of the poor affinity between silica and rubber, as the silica content increases, the dispersibility of silica in rubber decreases, and the incorporated silica cannot perform its inherent function. Thus, the conventional techniques leave room for improvement to achieve a balanced improvement in fuel economy, abrasion resistance, and wet grip performance.

CITATION LIST

Patent Literature

Patent Literature 1: JP 2013-544936 T

SUMMARY OF INVENTION

Technical Problem

The present invention aims to provide a pneumatic tire which provides a balanced improvement in fuel economy, abrasion resistance, and wet grip performance.

Solution to Problem

The present invention relates to a pneumatic tire, including a tread containing a tread rubber composition, the tread rubber composition containing a rubber component including 30% by mass or more of a styrene-butadiene rubber, the tread rubber composition containing, per 100 parts by mass of the rubber component:

80 to 150 parts by mass of silica;

0.1 to 3.0 parts by mass of a tetrazine compound represented by the following formula (1):

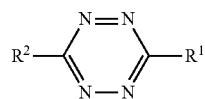
(1)

wherein $R^1$ and $R^2$ may be the same or different and each represent a hydrogen atom, —COOR$^3$ in which R$^3$ represents either a hydrogen atom or an alkyl group, or a C1-C11 monovalent hydrocarbon group optionally containing a heteroatom, and $R^1$ and $R^2$ may each form a salt; and 50 parts by mass or less of a hydrocarbon resin having a SP value of 7.5 to 10.5, the styrene-butadiene rubber having a styrene content of 23% by mass or higher.

The tetrazine compound is preferably a compound represented by the following formula (1-1), (1-2), (1-3), or (1-4):

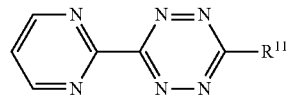
(1-1)

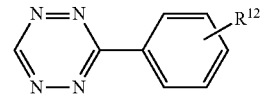
(1-2)

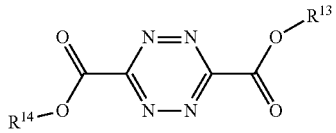
(1-3)

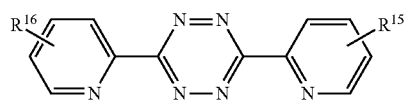
(1-4)

wherein in formula (1-1), $R^{11}$ represents a hydrogen atom, —COOR$^{17}$ in which $R^{17}$ represents either a hydrogen atom or an alkyl group, or a C1-C11 monovalent hydrocarbon group optionally containing a heteroatom, and $R^{11}$ may form a salt;

in formula (1-2), $R^{12}$ represents a functional group having at least one atom selected from the group consisting of nitrogen, oxygen, sulfur, fluorine, and silicon atoms, and $R^{12}$ may form a salt;

in formula (1-3), $R^{13}$ and $R^{14}$ may be the same or different and each represent a hydrogen atom or an alkyl group, and $R^{13}$ and $R^{14}$ may each form a salt; and in formula (1-4), $R^{15}$ and $R^{16}$ may be the same or different and each represent a hydrogen atom, —COOR$^{18}$ in which $R^{18}$ represents either a hydrogen atom or an alkyl group, or a functional group having at least one atom selected from the group consisting of nitrogen, oxygen, sulfur, fluorine, and silicon atoms, and $R^{15}$ and $R^{16}$ may each form a salt.

The tetrazine compound is preferably a compound represented by the following formula (1-1-1), (1-1-2), (1-2-1), (1-3-1), (1-4-1), or (1-4-2):

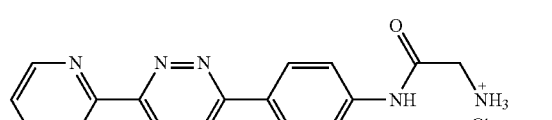
(1-1-1)

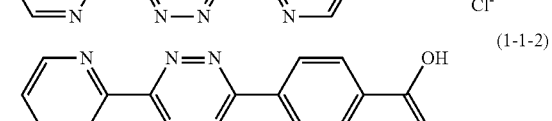
(1-1-2)

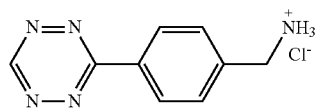
(1-2-1)

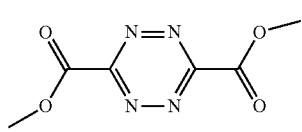
(1-3-1)

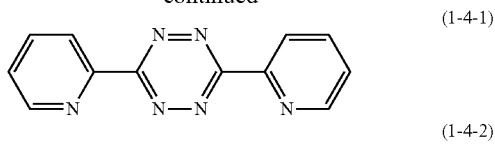

(1-4-1)

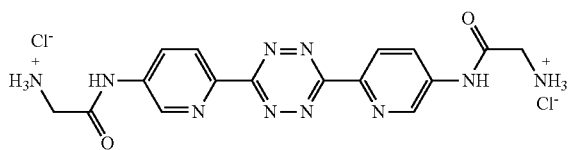

(1-4-2)

The hydrocarbon resin preferably has a weight average molecular weight of 300 to 1400.

The hydrocarbon resin is preferably a styrene resin.

The rubber component preferably includes, based on 100% by mass thereof, 5 to 50% by mass of a polybutadiene rubber.

Advantageous Effects of Invention

The pneumatic tire of the present invention includes a tread containing a tread rubber composition which contains a rubber component including 30% by mass or more of a styrene-butadiene rubber. Further, the tread rubber composition contains, per 100 parts by mass of the rubber component, 80 to 150 parts by mass of silica, 0.1 to 3.0 parts by mass of a tetrazine compound of formula (1), and 50 parts by mass or less of a hydrocarbon resin having a SP value of 7.5 to 10.5. Further, the styrene-butadiene rubber has a styrene content of 23% by mass or higher. Thus, the pneumatic tire provides a balanced improvement in fuel economy, abrasion resistance, and wet grip performance.

DESCRIPTION OF EMBODIMENTS

The pneumatic tire of the present invention includes a tread containing a tread rubber composition which contains a rubber component including 30% by mass or more of a styrene-butadiene rubber. Further, the tread rubber composition contains, per 100 parts by mass of the rubber component, 80 to 150 parts by mass of silica, 0.1 to 3.0 parts by mass of a tetrazine compound of formula (1), and 50 parts by mass or less of a hydrocarbon resin having a SP value of 7.5 to 10.5. Further, the styrene-butadiene rubber has a styrene content of 23% by mass or higher.

The present invention provides a balanced improvement in fuel economy, abrasion resistance, and wet grip performance. The mechanism of this effect may be explained as follows.

Styrene-butadiene rubber (SBR), particularly high styrene SBR with at least a predetermined styrene content, has poor affinity with silica. This tendency is more prominent when silica is present in a larger amount. Thus, when a large amount of silica is incorporated into high styrene SBR, unfortunately the silica cannot be sufficiently dispersed.

In contrast, in the present invention, the tetrazine compound reacts with the styrene-butadiene rubber, specifically the double bonds of the styrene-butadiene rubber, such that the number of side chains of the styrene-butadiene rubber is increased. As these side chains interact with silica, the styrene-butadiene rubber, although having inherently poor affinity with silica, has improved affinity with silica, so that it is possible to disperse silica in the vicinity of the styrene-butadiene rubber and therefore to disperse silica more uniformly in the rubber composition. This effect is more prominent when high styrene SBR is used, and is even more prominent at a high silica content.

Thus, in the present invention, it is considered that since a rubber component including at least a predetermined amount of SBR having a relatively high styrene content is combined with a predetermined amount (large amount) of silica as well as predetermined amounts of a tetrazine compound of formula (1) and a specific hydrocarbon resin, the number of side chains of the styrene-butadiene rubber is sufficiently increased to improve the affinity between the styrene-butadiene rubber and silica, as a result of which the large amount of silica sufficiently produces its reinforcing effect. In addition, the high styrene SBR with an increased number of side chains is also considered to have improved affinity with the specific hydrocarbon resin. Presumably for these reasons, a balanced improvement in fuel economy, abrasion resistance, and wet grip performance is achieved. In other words, it is believed that a large amount of silica sufficiently produces its reinforcing effect on a rubber composition containing high styrene SBR, and the high styrene SBR with an increased number of side chains also has improved affinity with a specific hydrocarbon resin, as a result of which a balanced improvement in fuel economy, abrasion resistance, and wet grip performance is achieved. Thus, the present invention synergistically improves the balance of fuel economy, abrasion resistance, and wet grip performance by interaction of the styrene-butadiene rubber, tetrazine compound, silica, and specific hydrocarbon resin.

The tread rubber composition according to the present invention will be described below.

In the present invention, the amount of the styrene-butadiene rubber (SBR) based on 100% by mass of the rubber component is 30% by mass or more. To more suitably achieve the effects of the present invention to achieve a more balanced improvement in fuel economy, abrasion resistance, and wet grip performance, the amount is preferably 50% by mass or more, more preferably 70% by mass or more. The upper limit may be 100% by mass, but is preferably 90% by mass or less, more preferably 85% by mass or less.

In the present invention, the term "rubber component" refers to at least one rubber having a weight average molecular weight (Mw) of 300,000 or more, preferably 350,000 or more. The upper limit of the Mw is not particularly limited, but is preferably 1,500,000 or less, more preferably 1,000,000 or less.

Herein, the Mw may be determined by gel permeation chromatography (GPC) (GPC-8000 series available from Tosoh Corporation, detector: differential refractometer, column: TSKGEL SUPERMALTPORE HZ-M available from Tosoh Corporation) calibrated with polystyrene standards.

Any SBR may be used. Examples include emulsion-polymerized styrene-butadiene rubber (E-SBR) and solution-polymerized styrene-butadiene rubber (S-SBR). These may be used alone, or two or more of these may be used in combination.

The SBR has a styrene content of 23% by mass or higher, preferably 30% by mass or higher, more preferably 35% by mass or higher, particularly preferably 40% by mass or higher. When the styrene content is not lower than the lower limit, the effects of the present invention can be suitably achieved. The styrene content is also preferably 60% by mass or lower, more preferably 50% by mass or lower. When the styrene content is not higher than the upper limit, better abrasion resistance and fuel economy tend to be obtained.

Herein, the styrene content of the SBR is determined by $H^1$-NMR.

The SBR preferably has a vinyl content of 5% by mass or higher, more preferably 10% by mass or higher, but preferably 80% by mass or lower, more preferably 70% by mass or lower, still more preferably 50% by mass or lower, particularly preferably 30% by mass or lower. When the vinyl content is within the range indicated above, the effects of the present invention tend to be better achieved.

Herein, the vinyl content (1,2-butadiene unit content) can be determined by infrared absorption spectrometry.

The SBR preferably has a weight average molecular weight (Mw) of 300,000 or more, more preferably 350,000 or more, still more preferably 800,000 or more, but preferably 1,500,000 or less, more preferably 1,300,000 or less. When the Mw is within the range indicated above, the effects of the present invention can be more suitably achieved.

The SBR may be an unmodified or modified SBR.

The modified SBR may be any SBR having a functional group interactive with a filler such as silica. For example, it may be a chain end-modified SBR obtained by modifying at least one chain end of SBR with a compound (modifier) having the functional group (a chain end-modified SBR terminated with the functional group); a backbone-modified SBR having the functional group in the backbone; a backbone- and chain end-modified SBR having the functional group in both the backbone and chain end (e.g., a backbone- and chain end-modified SBR in which the backbone has the functional group and at least one chain end is modified with the modifier); or a chain end-modified SBR that has been modified (coupled) with a polyfunctional compound having two or more epoxy groups in the molecule so that a hydroxyl or epoxy group is introduced.

Examples of the functional group include amino, amide, silyl, alkoxysilyl, isocyanate, imino, imidazole, urea, ether, carbonyl, oxycarbonyl, mercapto, sulfide, disulfide, sulfonyl, sulfinyl, thiocarbonyl, ammonium, imide, hydrazo, azo, diazo, carboxyl, nitrile, pyridyl, alkoxy, hydroxyl, oxy, and epoxy groups. These functional groups may be substituted. To more suitably achieve the effects of the present invention, amino (preferably amino whose hydrogen atom is replaced with a C1-C6 alkyl group), alkoxy (preferably C1-C6 alkoxy), and alkoxysilyl (preferably C1-C6 alkoxysilyl) groups are preferred among these.

The SBR may be a commercial product manufactured or sold by, for example, Sumitomo Chemical Co., Ltd., JSR Corporation, Asahi Kasei Corporation, or Zeon Corporation.

Examples of rubbers other than the SBR which may be used in the rubber component include diene rubbers such as isoprene-based rubbers, polybutadiene rubber (BR), styrene-butadiene rubber (SBR) having a styrene content of lower than 23% by mass, styrene-isoprene-butadiene rubber (SIBR), ethylene-propylene-diene rubber (EPDM), chloroprene rubber (CR), and acrylonitrile butadiene rubber (NBR), and butyl-based rubbers. Examples of the isoprene-based rubbers include natural rubber (NR), polyisoprene rubber (IR), refined NR, modified NR, and modified IR. The NR may be one commonly used in the tire industry such as SIR20, RSS #3, or TSR20. Any IR may be used, and examples include those commonly used in the tire industry, such as IR2200. Examples of the refined NR include deproteinized natural rubber (DPNR) and highly purified natural rubber (UPNR). Examples of the modified NR include epoxidized natural rubber (ENR), hydrogenated natural rubber (HNR), and grafted natural rubber. Examples of the modified IR include epoxidized polyisoprene rubber, hydrogenated polyisoprene rubber, and grafted polyisoprene rubber. These may be used alone, or two or more of these may be used in combination. Among these, BR is preferred in order to more suitably achieve the effects of the present invention.

Any BR may be used. Examples include BR having high cis content, such as BR1220 available from Zeon Corporation and BR130B and BR150B both available from Ube Industries, Ltd.; BR containing syndiotactic polybutadiene crystals, such as VCR412 and VCR617 both available from Ube Industries, Ltd.; and BR synthesized using rare earth catalysts (rare earth-catalyzed BR). These may be used alone, or two or more of these may be used in combination. In particular, the BR preferably has a cis content of 97% by mass or higher to improve abrasion resistance.

The BR preferably has a weight average molecular weight (Mw) of 300,000 or more, more preferably 350,000 or more, but preferably 550,000 or less, more preferably 500,000 or less, still more preferably 450,000 or less. When the Mw is within the range indicated above, the effects of the present invention can be more suitably achieved.

The BR may be an unmodified or modified BR. Examples of the modified BR include those in which functional groups as mentioned for the modified SBR are introduced.

The BR may be a commercial product of, for example, Ube Industries, Ltd, JSR Corporation, Asahi Kasei Corporation, or Zeon Corporation.

The amount of the BR, if present, based on 100% by mass of the rubber component is preferably 5% by mass or more, more preferably 10% by mass or more, still more preferably 15% by mass or more, but is preferably 50% by mass or less, more preferably 40% by mass or less, still more preferably 30% by mass or less. When the amount is adjusted within the range indicated above, the effects of the present invention tend to be better achieved.

The combined amount of the SBR (SBR having a styrene content of 23% by mass or higher) and BR based on 100% by mass of the rubber component is preferably 80% by mass or more, more preferably 90% by mass or more, and may be 100% by mass.

The rubber composition according to the present invention contains a tetrazine compound represented by the following formula (1):

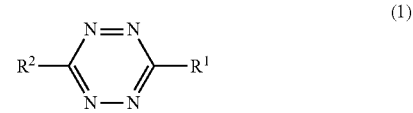

wherein $R^1$ and $R^2$ may be the same or different and each represent a hydrogen atom (—H), —COOR$^3$ in which $R^3$ represents either a hydrogen atom (—H) or an alkyl group, or a C1-C11 monovalent hydrocarbon group optionally containing a heteroatom, and $R^1$ and $R^2$ may each form a salt.

Examples of the heteroatom include nitrogen, oxygen, and sulfur atoms.

The hydrocarbon group as $R^1$ or $R^2$ has 1 to 11 carbon atoms, preferably 2 to 9 carbon atoms, more preferably 4 to 7 carbon atoms.

$R^1$ and $R^2$ are each preferably —COOR$^3$ or a heteroatom-containing hydrocarbon group because such a tetrazine compound is expected to interact easily with a reinforcing filler, particularly carbon black or silica, thereby resulting in better fuel economy, abrasion resistance, and wet grip performance. More preferably, both $R^1$ and $R^2$ are heteroatom-containing hydrocarbon groups.

The hydrocarbon group as $R^1$ or $R^2$ is not particularly limited, but is preferably a homocyclic or heterocyclic group because such a tetrazine compound is expected to interact easily with a reinforcing filler, particularly carbon black or silica, thereby resulting in better fuel economy, abrasion resistance, and wet grip performance. More preferably, at least one of $R^1$ and $R^2$ is a heterocyclic group. Still more preferably, both $R^1$ and $R^2$ are heterocyclic groups.

Herein, the term "homocyclic group" refers to a group having a ring structure consisting only of carbon atoms, and the term "heterocyclic group" refers to a group having a ring structure consisting of two or more types of elements including a carbon atom.

Examples of the homocyclic group include aryl and cycloalkyl groups. Among these, aryl groups are preferred.

Examples of aryl groups include phenyl and naphthyl groups. Among these, a phenyl group is preferred.

Examples of cycloalkyl groups include cyclopentyl and cyclohexyl groups.

The heterocyclic group is preferably a nitrogen-containing heterocyclic group which contains a nitrogen atom as a ring-forming heteroatom, more preferably a nitrogen-containing heterocyclic group which contains only a nitrogen atom as a ring-forming heteroatom.

Examples of the nitrogen-containing heterocyclic group include aziridinyl, azetidinyl, pyrrolidinyl, piperidinyl, hexamethyleneimino, imidazolidyl, piperazinyl, pyrazolidyl, pyrrolyl, imidazolyl, pyrazolyl, pyridyl, pyridazyl, pyrimidyl, pyrazyl, quinolyl, isoquinolyl, cinnolinyl, quinazolinyl, and phthalazinyl groups. Among these, pyridyl and pyrimidyl groups are preferred, with a pyridyl group being more preferred.

The hydrogen atom in the homocyclic or heterocyclic group may be replaced by a substituent. Preferably, it is replaced by a substituent because such a tetrazine compound is expected to interact easily with a reinforcing filler, particularly carbon black or silica, thereby resulting in better fuel economy, abrasion resistance, and wet grip performance.

Examples of the substituent include amino, amide, silyl, alkoxysilyl, isocyanate, imino, imidazole, urea, ether, carbonyl, oxycarbonyl, mercapto, sulfide, disulfide, sulfonyl, sulfinyl, thiocarbonyl, ammonium, imide, hydrazo, azo, diazo, carboxyl, nitrile, pyridyl, alkoxy, hydroxyl, oxy, epoxy, sulfonate, and trifluoromethyl groups. These substituents may be further substituted by the above-listed substituents or groups other than the above-listed substituents, such as alkylene or alkyl groups. To more suitably achieve the effects of the present invention, the substituent is preferably a carboxyl group, the above-defined —$COOR^3$, an amino group (preferably a group represented by the formula (A) or (B) below), an alkoxy group (preferably a C1-C6 alkoxy group), or an alkoxysilyl group (preferably a C1-C6 alkoxysilyl group), among others.

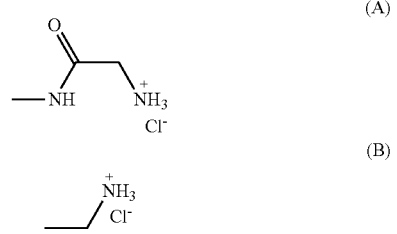

(A)

(B)

The substituent may form a salt, as in the group of formula (A) or (B). Examples of salts that may be formed include salts formed between an amino group and a halogen atom, salts formed between a carboxyl group and a monovalent metal such as Na or K, and salts formed between a sulfonate group and the monovalent metal.

$R^3$ in the group —$COOR^3$ represents a hydrogen atom or an alkyl group. The alkyl group preferably has 1 to 8 carbon atoms, more preferably 1 to 3 carbon atoms.

Examples of the alkyl group include methyl, ethyl, n-propyl, isopropyl, n-butyl, sec-butyl, and tert-butyl groups.

$R^3$ is preferably an alkyl group.

The tetrazine compound of formula (1) may be any tetrazine compound that can react with a diene rubber. The tetrazine compound may be a single compound or a combination of two or more compounds. To more suitably achieve the effects of the present invention, the tetrazine compound is preferably a compound represented by the formula (1-1), (1-2), (1-3), or (1-4) below (particularly formula (1-1) or (1-4)), more preferably a compound represented by the formula (1-1-1), (1-1-2), (1-2-1), (1-3-1), (1-4-1), or (1-4-2) below (particularly formula (1-1-1) or (1-4-1)), among others.

The tetrazine compound of formula (1) may be a commercial product or may be synthesized by known methods.

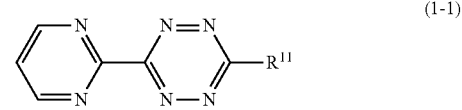

(1-1)

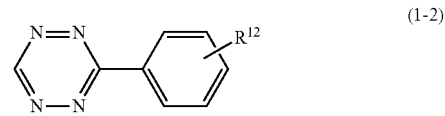

(1-2)

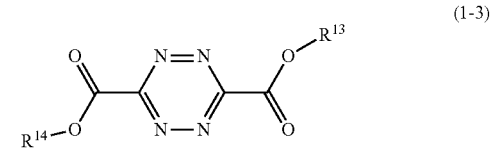

(1-3)

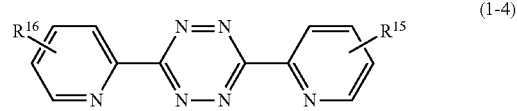

(1-4)

In formula (1-1), $R^{11}$ represents a hydrogen atom (—H), —$COOR^{17}$ in which $R^{17}$ represents either a hydrogen atom (—H) or an alkyl group, or a C1-C11 monovalent hydrocarbon group optionally containing a heteroatom, and $R^{11}$ may form a salt.

In formula (1-2), $R^{12}$ represents a functional group containing at least one atom selected from the group consisting of nitrogen, oxygen, sulfur, fluorine, and silicon atoms, and $R^{12}$ may form a salt.

In formula (1-3), $R^{13}$ and $R^{14}$ may be the same or different and each represent a hydrogen atom (—H) or an alkyl group, and $R^{13}$ and $R^{14}$ may each form a salt.

In formula (1-4), $R^{15}$ and $R^{16}$ may be the same or different and each represent a hydrogen atom (—H), —$COOR^{18}$ in which $R^{18}$ represents either a hydrogen atom (—H) or an alkyl group, or a functional group containing at least one atom selected from the group consisting of nitrogen, oxygen, sulfur, fluorine, and silicon atoms, and $R^{15}$ and $R^{16}$ may each form a salt.

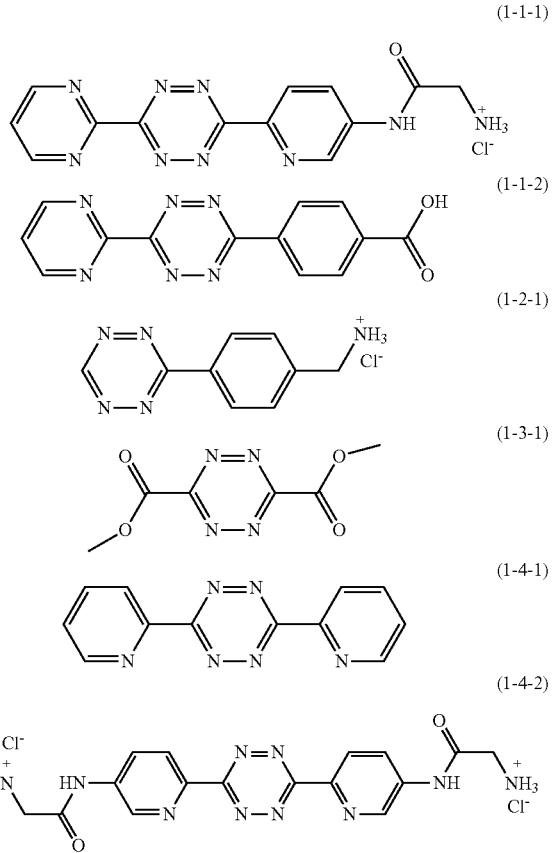

Examples of the heteroatom in $R^{11}$ include those described for the heteroatom in $R^1$ or $R^2$.

The carbon number of the hydrocarbon group as $R^{11}$ is as described for the hydrocarbon group as $R^1$ or $R^2$, and suitable embodiments thereof are also the same as above.

$R^{11}$ is preferably —COOR$^{17}$ or a heteroatom-containing hydrocarbon group because such a tetrazine compound is expected to interact easily with a reinforcing filler, particularly carbon black or silica, thereby resulting in better fuel economy, abrasion resistance, and wet grip performance.

Examples of the hydrocarbon group as $R^{11}$ include those described for the hydrocarbon group as $R^1$ or $R^2$, and suitable embodiments thereof are also the same as above.

$R^{17}$ in the group —COOR$^{17}$ represents a hydrogen atom or an alkyl group. Examples of the alkyl group include those described for the alkyl group as $R^3$, and suitable embodiments thereof are also the same as above.

$R^{17}$ is preferably an alkyl group.

Examples of the functional group containing at least one atom selected from the group consisting of nitrogen, oxygen, sulfur, fluorine, and silicon atoms as $R^{12}$ include those described for the substituent, and suitable embodiments thereof are also the same as above.

$R^{12}$ may be at any of the ortho, meta, and para positions. To more suitably achieve the effects of the present invention, $R^{12}$ is preferably at the para position.

Examples of the alkyl group as $R^{13}$ or $R^{14}$ include those described for the alkyl group as $R^3$, and suitable embodiments thereof are also the same as above. $R^{13}$ and $R^{14}$ are each preferably an alkyl group.

To obtain better fuel economy, abrasion resistance, and wet grip performance, $R^{15}$ and $R^{16}$ are each preferably a hydrogen atom or a functional group containing at least one atom selected from the group consisting of nitrogen, oxygen, sulfur, fluorine, and silicon atoms.

$R^{18}$ in —COOR$^{18}$ represents a hydrogen atom or an alkyl group. Examples of the alkyl group include those described for the alkyl group as $R^3$, and suitable embodiments thereof are also the same as above.

$R^{18}$ is preferably an alkyl group.

Examples of the functional group containing at least one atom selected from the group consisting of nitrogen, oxygen, sulfur, fluorine, and silicon atoms as $R^{15}$ or $R^{16}$ include those described for the substituent, and suitable embodiments thereof are also the same as above.

$R^{15}$ and $R^{16}$ may each be at any of the ortho, meta, and para positions. To more suitably achieve the effects of the present invention, $R^{15}$ and $R^{16}$ are each preferably at the para position, and more preferably both at the para position.

The amount of the tetrazine compound per 100 parts by mass of the rubber component is 0.1 parts by mass or more, preferably 0.5 parts by mass or more, more preferably 0.8 parts by mass or more. When the amount is not less than the lower limit, the effects of the present invention tend to be well achieved. Moreover, the amount is 3.0 parts by mass or less, preferably 2.5 parts by mass or less, more preferably 1.5 parts by mass or less. When the amount is not more than the upper limit, the effects of the present invention tend to be well achieved.

Herein, the amount of the tetrazine compound of formula (1) may refer to the combined amount of two or more tetrazine compounds, if present.

The rubber composition according to the present invention contains silica as a reinforcing filler.

In addition to the silica, the reinforcing filler may include other fillers such as carbon black, calcium carbonate, talc, alumina, clay, aluminum hydroxide, aluminum oxide, and mica. Among these, carbon black is preferred in order to more suitably achieve the effects of the present invention.

The amount of the reinforcing filler per 100 parts by mass of the rubber component is preferably 80 parts by mass or more, more preferably 100 parts by mass or more, still more preferably 120 parts by mass or more. When the amount is not less than the lower limit, sufficient reinforcement tends to be provided, and better abrasion resistance and wet grip performance tend to be obtained. The amount is also preferably 250 parts by mass or less, more preferably 200 parts by mass or less, still more preferably 180 parts by mass or less, particularly preferably 160 parts by mass or less. When the amount is not more than the upper limit, better fuel economy tends to be obtained.

Examples of the silica include dry silica (anhydrous silica) and wet silica (hydrous silica). Wet silica is preferred because it contains a large number of silanol groups.

The silica preferably has a nitrogen adsorption specific surface area ($N_2SA$) of 90 m$^2$/g or more, more preferably 120 m$^2$/g or more, still more preferably 150 m$^2$/g or more. When the $N_2SA$ is not less than the lower limit, better abrasion resistance and wet grip performance can be obtained. The $N_2SA$ is preferably 400 m$^2$/g or less, more preferably 200 m$^2$/g or less, still more preferably 180 m$^2$/g or less. When the $N_2SA$ is not more than the upper limit, better fuel economy can be obtained.

The nitrogen adsorption specific surface area of the silica is determined by the BET method in accordance with ASTM D3037-81.

The silica may be a commercial product of, for example, Degussa, Rhodia, Tosoh Silica Corporation, Solvay Japan, or Tokuyama Corporation.

The amount of the silica per 100 parts by mass of the rubber component is 80 parts by mass or more, preferably 100 parts by mass or more, more preferably 120 parts by mass or more. When the amount is not less than the lower limit, better fuel economy, abrasion resistance, and wet grip performance can be obtained. Moreover, the amount is 150 parts by mass or less, preferably 130 parts by mass or less. When the amount is not more than the upper limit, the silica is more likely to disperse uniformly in the rubber composition, thereby resulting in better fuel economy, abrasion resistance, and wet grip performance.

The proportion of the silica based on 100% by mass of the total reinforcing filler is 50% by mass or more, preferably 60% by mass or more, more preferably 70% by mass or more, still more preferably 80% by mass or more, particularly preferably 90% by mass or more, and may be 100% by mass.

Any carbon black may be used. Examples include N134, N110, N220, N234, N219, N339, N330, N326, N351, N550, and N762. These may be used alone, or two or more of these may be used in combination.

The carbon black preferably has a nitrogen adsorption specific surface area ($N_2SA$) of 5 $m^2/g$ or more, more preferably 50 $m^2/g$ or more, still more preferably 100 $m^2/g$ or more. When the $N_2SA$ is not less than the lower limit, better abrasion resistance and wet grip performance tend to be obtained. The $N_2SA$ is also preferably 300 $m^2/g$ or less, more preferably 150 $m^2/g$ or less, still more preferably 130 $m^2/g$ or less. With a $N_2SA$ of not more than the upper limit, the carbon black tends to disperse better, thereby resulting in better abrasion resistance, wet grip performance, and fuel economy.

The nitrogen adsorption specific surface area of the carbon black is determined in accordance with JIS K6217-2: 2001.

The carbon black may be a commercial product of, for example, Asahi Carbon Co., Ltd., Cabot Japan K.K., Tokai Carbon Co., Ltd., Mitsubishi Chemical Corporation, Lion Corporation, NSCC Carbon Co., Ltd., or Columbia Carbon.

The amount of the carbon black, if present, per 100 parts by mass of the rubber component is preferably 3 parts by mass or more, more preferably 5 parts by mass or more. When the amount is not less than the lower limit, sufficient reinforcement tends to be provided, and better abrasion resistance and wet grip performance tend to be obtained. The amount is also preferably 50 parts by mass or less, more preferably 30 parts by mass or less, still more preferably 10 parts by mass or less. When the amount is not more than the upper limit, better fuel economy tends to be obtained.

To better achieve the effects of the present invention, the combined amount of the carbon black and silica per 100 parts by mass of the rubber component is preferably 80 to 200 parts by mass, more preferably 90 to 180 parts by mass, still more preferably 100 to 160 parts by mass.

The rubber composition according to the present invention preferably contains a silane coupling agent together with silica.

Any silane coupling agent may be used. Examples include sulfide silane coupling agents such as bis(3-triethoxysilylpropyl)tetrasulfide, bis(2-triethoxysilylethyl)tetrasulfide, bis(4-triethoxysilylbutyl)tetrasulfide, bis(3-trimethoxysilylpropyl)tetrasulfide, bis(2-trimethoxysilylethyl)tetrasulfide, bis(2-triethoxysilylethyl)trisulfide, bis(4-trimethoxysilylbutyl)trisulfide, bis(3-triethoxysilylpropyl)disulfide, bis(2-triethoxysilylethyl)disulfide, bis(4-triethoxysilylbutyl)disulfide, bis(3-trimethoxysilylpropyl)disulfide, bis(2-trimethoxysilylethyl)disulfide, bis(4-trimethoxysilylbutyl)disulfide, 3-trimethoxysilylpropyl-N,N-dimethylthiocarbamoyl tetrasulfide, 2-triethoxysilylethyl-N,N-dimethylthiocarbamoyl tetrasulfide, and 3-triethoxysilylpropyl methacrylate monosulfide; mercapto silane coupling agents such as 3-mercaptopropyltrimethoxysilane, 2-mercaptoethyltriethoxysilane, and NXT and NXT-Z both available from Momentive; vinyl silane coupling agents such as vinyltriethoxysilane and vinyltrimethoxysilane; amino silane coupling agents such as 3-aminopropyltriethoxysilane and 3-aminopropyltrimethoxysilane; glycidoxy silane coupling agents such as γ-glycidoxypropyltriethoxysilane and γ-glycidoxypropyltrimethoxysilane; nitro silane coupling agents such as 3-nitropropyltrimethoxysilane and 3-nitropropyltriethoxysilane; and chloro silane coupling agents such as 3-chloropropyltrimethoxysilane and 3-chloropropyltriethoxysilane. These may be used alone, or two or more of these may be used in combination. Among these, sulfide or mercapto silane coupling agents are preferred in order to better achieve the effects of the present invention.

The silane coupling agent is preferably a silane coupling agent represented by the formula (2) below. In this case, better fuel economy, abrasion resistance, and wet grip performance can be obtained.

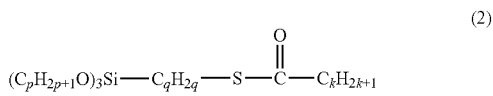

(2)

In formula (2), p represents an integer of 1 to 3, q represents an integer of 1 to 5, and k represents an integer of 5 to 12.

In formula (2), p is an integer of 1 to 3, preferably 2. When p is 3 or less, the coupling reaction tends to proceed rapidly.

q is an integer of 1 to 5, preferably 2 to 4, more preferably 3. When q is 1 to 5, the synthesis tends to be facilitated.

k is an integer of 5 to 12, preferably 5 to 10, more preferably 6 to 8, still more preferably 7.

Examples of the silane coupling agent of formula (2) include 3-octanoylthio-1-propyltriethoxysilane.

The silane coupling agent may be a commercial product of, for example, Degussa, Momentive, Shin-Etsu Silicone, Tokyo Chemical Industry Co., Ltd., AZmax. Co., or Dow Corning Toray Co., Ltd.

The amount of the silane coupling agent, if present, per 100 parts by mass of the silica is preferably 3 parts by mass or more, more preferably 5 parts by mass or more. When the amount is 3 parts by mass or more, the incorporated silane coupling agent tends to produce its effect. The amount is also preferably 20 parts by mass or less, more preferably 10 parts by mass or less. When the amount is 20 parts by mass or less, an effect commensurate with the amount tends to be provided, and good processability during kneading tends to be obtained.

The present invention uses a hydrocarbon resin having a SP value of 7.5 to 10.5.

Herein, the term "hydrocarbon resin" refers to a polymer produced from a hydrocarbon monomer as a structural monomer, such as a polymer produced by polymerizing a hydrocarbon monomer as a main component (at least 50% by mass). The term "hydrocarbon monomer" refers to a monomer containing a hydrocarbon.

The hydrocarbon resin has a SP value of 7.5 to 10.5, preferably 8.0 or higher, more preferably 8.3 or higher, still more preferably 8.5 or higher, particularly preferably 8.7 or higher, but preferably 10.0 or lower, more preferably 9.8 or lower, still more preferably 9.6 or lower, particularly preferably 9.4 or lower.

Herein, the term "SP value" refers to a solubility parameter determined based on the structure of the compound by a Hoy method described in, for example, K. L. Hoy, "Table of Solubility Parameters", Solvent and Coatings Materials Research and Development Department, Union Carbites Corp. (1985).

The hydrocarbon resin preferably has a weight average molecular weight (Mw) of 300 or more, more preferably 600 or more, but preferably 1400 or less, more preferably 1200 or less. When the Mw is within the range indicated above, the effects of the present invention (particularly the effect of improving wet grip performance) can be more suitably achieved.

The hydrocarbon resin preferably has a softening point of 30° C. or higher, more preferably 60° C. or higher, still more preferably 80° C. or higher. When the softening point is 30° C. or higher, better abrasion resistance and wet grip performance tend to be obtained. The softening point is also preferably 160° C. or lower, more preferably 140° C. or lower, still more preferably 120° C. or lower. With a softening point of 160° C. or lower, the resin tends to disperse well, thereby resulting in better abrasion resistance, wet grip performance, and fuel economy.

In the present invention, the softening point of the resin is determined in accordance with JIS K 6220-1:2001 using a ring and ball softening point measuring apparatus and defined as the temperature at which the ball drops down.

Any hydrocarbon resin satisfying the above-specified SP value may be used. Examples include styrene resins, coumarone-indene resins, terpene resins, p-t-butylphenol acetylene resins, acrylic resins, dicyclopentadiene resins (DCPD resins), C5 petroleum resins, C9 petroleum resins, and C5C9 petroleum resins. These may be used alone, or two or more of these may be used in combination. To more suitably achieve the effects of the present invention, styrene resins are preferred among these.

The term "styrene resin" refers to a polymer produced from a styrenic monomer as a structural monomer, such as a polymer produced by polymerizing a styrenic monomer as a main component (at least 50% by mass). Specific examples include homopolymers produced by polymerization of styrenic monomers (e.g. styrene, o-methylstyrene, m-methylstyrene, p-methylstyrene, α-methylstyrene, p-methoxystyrene, p-tert-butylstyrene, p-phenylstyrene, o-chlorostyrene, m-chlorostyrene, p-chlorostyrene) alone, copolymers produced by copolymerization of two or more styrenic monomers, and copolymers of styrenic monomers and additional monomers copolymerizable therewith.

Examples of the additional monomers include acrylonitriles such as acrylonitrile and methacrylonitrile, unsaturated carboxylic acids such as acrylic acid and methacrylic acid, unsaturated carboxylic acid esters such as methyl acrylate and methyl methacrylate, dienes such as chloroprene, butadiene, and isoprene, olefins such as 1-butene and 1-pentene, and α,β-unsaturated carboxylic acids and acid anhydrides thereof such as maleic anhydride.

Among such styrene resins, α-methylstyrene resins (e.g. α-methylstyrene homopolymers, copolymers of α-methylstyrene and styrene) are preferred from the standpoint of the balance of the properties.

The term "coumarone-indene resin" refers to a resin that contains coumarone and indene as monomer components forming the skeleton (backbone) of the resin. Examples of monomer components other than coumarone and indene which may be contained in the skeleton include styrene, α-methylstyrene, methylindene, and vinyltoluene.

Examples of the terpene resins include polyterpene, terpene phenol, and aromatic modified terpene resins.

The term "polyterpene" refers to a resin produced by polymerizing a terpene compound, or a hydrogenated product of the resin. The term "terpene compound" refers to a hydrocarbon having a composition represented by $(C_5H_8)_n$ or an oxygen-containing derivative thereof, each of which has a terpene backbone and is classified as, for example, a monoterpene ($C_{10}H_{16}$), sesquiterpene ($C_{15}H_{24}$), or diterpene ($C_{20}H_{32}$). Examples of such terpene compounds include α-pinene, β-pinene, dipentene, limonene, myrcene, alloocimene, ocimene, α-phellandrene, α-terpinene, γ-terpinene, terpinolene, 1,8-cineole, 1,4-cineole, α-terpineol, β-terpineol, and γ-terpineol.

Examples of the polyterpene resins include terpene resins made from the above-mentioned terpene compounds, such as α-pinene resins, β-pinene resins, limonene resins, dipentene resins, and β-pinene-limonene resins, and hydrogenated terpene resins produced by hydrogenation of the foregoing terpene resins.

Examples of the terpene phenol resins include resins produced by copolymerization of the above-mentioned terpene compounds and phenolic compounds, and resins produced by hydrogenation of these resins. Specific examples include resins produced by condensation of the above-mentioned terpene compounds, phenolic compounds, and formaldehyde. The phenolic compounds include, for example, phenol, bisphenol A, cresol, and xylenol.

Examples of the aromatic modified terpene resins include resins obtained by modification of terpene resins with aromatic compounds, and resins produced by hydrogenation of these resins. The aromatic compounds may be any compound having an aromatic ring, and examples include phenol compounds such as phenol, alkylphenols, alkoxyphenols, and unsaturated hydrocarbon group-containing phenols; naphthol compounds such as naphthol, alkylnaphthols, alkoxynaphthols, and unsaturated hydrocarbon group-containing naphthols; styrene and styrene derivatives such as alkylstyrenes, alkoxystyrenes, and unsaturated hydrocarbon group-containing styrenes; and coumarone and indene.

Examples of the p-t-butylphenol acetylene resins include resins produced by condensation of p-t-butylphenol and acetylene.

Any acrylic resin may be used, but solvent-free acrylic resins are suitable for the purpose of obtaining resins that contain only slight impurities and have a sharp molecular weight distribution.

Examples of the solvent-free acrylic resins include (meth)acrylic resins (polymers) synthesized by high temperature continuous polymerization (high temperature continuous bulk polymerization as described in, for example, U.S. Pat. No. 4,414,370, JP S59-6207 A, JP H5-58005 B, JP H1-313522 A, U.S. Pat. No. 5,010,166, annual research report TREND 2000 issued by Toagosei Co., Ltd., vol. 3, pp. 42-45) using no or minimal amounts of auxiliary raw materials such as polymerization initiators, chain transfer agents, and organic solvents. In the present invention, the term "(meth)acrylic" means methacrylic and acrylic.

Preferred are acrylic resins substantially free of auxiliary raw materials such as polymerization initiators, chain transfer agents, and organic solvents. Also preferred are acrylic resins produced by continuous polymerization and having a relatively narrow composition distribution or molecular weight distribution.

As described above, acrylic resins substantially free of auxiliary raw materials such as polymerization initiators, chain transfer agents, and organic solvents, namely high purity acrylic resins, are preferred. The purity of the acrylic resins (the resin content of the resins) is preferably 95% by mass or more, more preferably 97% by mass or more.

Examples of the monomer components of the acrylic resins include (meth)acrylic acids and (meth)acrylic acid derivatives such as (meth)acrylic acid esters (e.g., alkyl esters, aryl esters, aralkyl esters), (meth)acrylamides, and (meth)acrylamide derivatives.

In addition to (meth)acrylic acids or (meth)acrylic acid derivatives, the monomer components of the acrylic resins may also include aromatic vinyls such as styrene, α-methylstyrene, vinyltoluene, vinylnaphthalene, divinylbenzene, trivinylbenzene, or divinylnaphthalene.

The acrylic resins may be formed only of (meth)acrylic components or may further contain constituent components other than (meth)acrylic components.

The acrylic resins may possess a hydroxy group, a carboxyl group, a silanol group, or other groups.

The resin (e.g. styrene resin or coumarone-indene resin) may be a commercial product of, for example, Maruzen Petrochemical Co., Ltd., Sumitomo Bakelite Co., Ltd., Yasuhara Chemical Co., Ltd., Tosoh Corporation, Rutgers Chemicals, BASF, Arizona Chemical, Nitto Chemical Co., Ltd., Nippon Shokubai Co., Ltd., JX Energy Corporation, Arakawa Chemical Industries, Ltd., or Taoka Chemical Co., Ltd.

The amount of the hydrocarbon resin, if present, per 100 parts by mass of the rubber component is preferably 1 part by mass or more, more preferably 3 parts by mass or more, still more preferably 5 parts by mass or more, but is preferably 50 parts by mass or less, more preferably 30 parts by mass or less, still more preferably 20 parts by mass or less. When the amount is within the range indicated above, the effects of the present invention (particularly the effect of improving wet grip performance) can be more suitably achieved.

The present invention preferably uses a low-molecular-weight diene polymer having a weight average molecular weight of 200,000 or less. When a low-molecular-weight diene polymer which can crosslink with the rubber component is incorporated, it is believed to increase the distance between the rubber component molecules without inhibiting the affinity between the tetrazine compound and silica, thereby further improving wet grip performance.

The monomer component for forming the low-molecular-weight diene polymer may be any diene monomer, and examples include conjugated diene compounds such as 1,3-butadiene, isoprene, 1,3-pentadiene, 2,3-dimethyl-1,3-butadiene, and 1,3-hexadiene, and branched conjugated diene compounds such as myrcene and farnesene. In addition to the diene monomer, a vinyl compound such as styrene, α-methylstyrene, α-vinylnaphthalene, or β-vinylnaphthalene may also be used as a monomer component.

Examples of the low-molecular-weight diene polymer include styrene-butadiene copolymers, butadiene polymers, isoprene polymers, acrylonitrile butadiene copolymers, myrcene polymers, farnesene polymers, myrcene-butadiene copolymers, myrcene-styrene copolymers, farnesene-butadiene copolymers, and farnesene-styrene copolymers. To more suitably achieve the effects of the present invention, styrene-butadiene copolymers, butadiene polymers, isoprene polymers, myrcene polymers, farnesene polymers, myrcene-butadiene copolymers, myrcene-styrene copolymers, farnesene-butadiene copolymers, and farnesene-styrene copolymers are preferred among these.

The low-molecular-weight diene polymer is preferably liquid at 25° C. Moreover, the double bonds in the conjugated diene units of the low-molecular-weight diene polymer may be hydrogenated.

The low-molecular-weight diene polymer preferably has a weight average molecular weight (Mw) of 1,000 or more, more preferably 1,500 or more, but preferably 150,000 or less, more preferably 100,000 or less, still more preferably 50,000 or less, particularly preferably 20,000 or less, most preferably 15,000 or less. When the Mw is within the range indicated above, the effects of the present invention (particularly the effect of improving wet grip performance) can be more suitably achieved.

The amount of the low-molecular-weight diene polymer, if present, per 100 parts by mass of the rubber component is preferably 1 part by mass or more, more preferably 5 parts by mass or more, but is preferably 50 parts by mass or less, more preferably 40 parts by mass or less, still more preferably 30 parts by mass or less. When the amount is within the range indicated above, the effects of the present invention (particularly the effect of improving wet grip performance) can be more suitably achieved.

The rubber composition according to the present invention may contain an oil.

Examples of the oil include process oils and plant oils, and mixtures thereof. Examples of the process oils include paraffinic process oils, aromatic process oils, and naphthenic process oils. Examples of the plant oils include castor oil, cotton seed oil, linseed oil, rapeseed oil, soybean oil, palm oil, coconut oil, peanut oil, rosin, pine oil, pine tar, tall oil, corn oil, rice oil, safflower oil, sesame oil, olive oil, sunflower oil, palm kernel oil, *camellia* oil, jojoba oil, macadamia nut oil, and tung oil. These may be used, alone, or two or more of these may be used in combination.

The oil may be a commercial product of, for example, Idemitsu Kosan Co., Ltd., Sankyo Yuka Kogyo K.K., Japan Energy Corporation, Olisoy, H&R, Hokoku Corporation, Showa Shell Sekiyu K.K., or Fuji Kosan Co., Ltd.

The amount of the oil, if present, per 100 parts by mass of the rubber component is preferably 1 part by mass or more, more preferably 10 parts by mass or more, but is preferably 60 parts by mass or less, more preferably 40 parts by mass or less. The amount of the oil here includes the amount of the oil contained in rubber (oil-extended rubber).

The rubber composition according to the present invention preferably contains a wax.

Any wax may be used. Examples include petroleum waxes such as paraffin waxes and microcrystalline waxes; naturally-occurring waxes such as plant waxes and animal waxes; and synthetic waxes such as polymers of ethylene, propylene, or other similar monomers. These may be used alone, or two or more of these may be used in combination.

The wax may be a commercial product of, for example, Ouchi Shinko Chemical Industrial Co., Ltd., Nippon Seiro Co., Ltd., or Seiko Chemical Co., Ltd.

The amount of the wax, if present, per 100 parts by mass of the rubber component is preferably 0.5 parts by mass or more, more preferably 1 part by mass or more, but is preferably 10 parts by mass or less, more preferably 7 parts by mass or less.

The rubber composition according to the present invention preferably contains an antioxidant.

Examples of the antioxidant include: naphthylamine antioxidants such as phenyl-α-naphthylamine; diphenylamine antioxidants such as octylated diphenylamine and 4,4'-bis (α,α'-dimethylbenzyl)diphenylamine; p-phenylenediamine antioxidants such as N-isopropyl-N'-phenyl-p-phenylenediamine, N-(1,3-dimethylbutyl)-N'-phenyl-p-phenylenediamine, and N,N'-di-2-naphthyl-p-phenylenediamine; quinoline antioxidants such as 2,2,4-trimethyl-1,2-dihydroquinoline polymer; monophenolic antioxidants such as 2,6-di-t-butyl-4-methylphenol and styrenated phenol; and bis-, tris-, or polyphenolic antioxidants such as tetrakis[methylene-3-(3',5'-di-t-butyl-4'-hydroxyphenyl)-propionate]methane. These may be used alone, or two or more of these may be used in combination. Among these, p-phenylenediamine or quinoline antioxidants are preferred, with N-(1,3-dimethylbutyl)-N'-phenyl-p-phenylenediamine or 2,2,4-trimethyl-1,2-dihydroquinoline polymer being more preferred.

The antioxidant may be a commercial product of, for example, Seiko Chemical Co., Ltd., Sumitomo Chemical Co., Ltd., Ouchi Shinko Chemical Industrial Co., Ltd., or Flexsys.

The amount of the antioxidant, if present, per 100 parts by mass of the rubber component is preferably 1 part by mass or more, more preferably 2 parts by mass or more, but is preferably 10 parts by mass or less, more preferably 7 parts by mass or less.

The rubber composition according to the present invention preferably contains stearic acid.

Conventional stearic acid may be used. Examples include commercial products of NOF Corporation, Kao Corporation, FUJIFILM Wako Pure Chemical Corporation, Chiba Fatty Acid Co., Ltd., etc.

The amount of the stearic acid, if present, per 100 parts by mass of the rubber component is preferably 0.5 parts by mass or more, more preferably 1 part by mass or more, but is preferably 10 parts by mass or less, more preferably 5 parts by mass or less. When the amount is within the range indicated above, the effects of the present invention tend to be well achieved.

The rubber composition according to the present invention preferably contains zinc oxide.

Conventional zinc oxide may be used. Examples include commercial products of Mitsui Mining & Smelting Co., Ltd., Toho Zinc Co., Ltd., HakusuiTech Co., Ltd., Seido Chemical Industry Co., Ltd., Sakai Chemical Industry Co., Ltd., etc.

The amount of the zinc oxide, if present, per 100 parts by mass of the rubber component is preferably 0.5 parts by mass or more, more preferably 1 part by mass or more, but is preferably 10 parts by mass or less, more preferably 5 parts by mass or less. When the amount is within the range indicated above, the effects of the present invention tend to be better achieved.

The rubber composition according to the present invention preferably contains sulfur.

Examples of the sulfur include those commonly used in the rubber industry, such as powdered sulfur, precipitated sulfur, colloidal sulfur, insoluble sulfur, highly dispersible sulfur, and soluble sulfur. These may be used alone, or two or more of these may be used in combination.

The sulfur may be a commercial product of, for example, Tsurumi Chemical Industry Co., Ltd., Karuizawa Sulfur Co., Ltd., Shikoku Chemicals Corporation, Flexsys, Nippon Kanryu Industry Co., Ltd., or Hosoi Chemical Industry Co., Ltd.

The amount of the sulfur, if present, per 100 parts by mass of the rubber component is preferably 0.5 parts by mass or more, more preferably 0.8 parts by mass or more, but is preferably 10 parts by mass or less, more preferably 5 parts by mass or less, still more preferably 3 parts by mass or less. When the amount is within the range indicated above, the effects of the present invention tend to be well achieved.

The rubber composition according to the present invention preferably contains a vulcanization accelerator.

Examples of the vulcanization accelerator include thiazole vulcanization accelerators such as 2-mercaptobenzothiazole, di-2-benzothiazolyl disulfide, and N-cyclohexyl-2-benzothiazylsulfenamide; thiuram vulcanization accelerators such as tetramethylthiuram disulfide (TMTD), tetrabenzylthiuram disulfide (TBzTD), and tetrakis (2-ethylhexyl) thiuram disulfide (TOT-N); sulfenamide vulcanization accelerators such as N-cyclohexyl-2-benzothiazole sulfenamide, N-t-butyl-2-benzothiazolylsulfenamide, N-oxyethylene-2-benzothiazole sulfenamide, N-oxyethylene-2-benzothiazole sulfonamide, and N,N'-diisopropyl-2-benzothiazole sulfenamide; and guanidine vulcanization accelerators such as diphenylguanidine, diorthotolylguanidine, and orthotolylbiguanidine. These may be used alone, or two or more of these may be used in combination. Among these, sulfenamide and/or guanidiene vulcanization accelerators are preferred to more suitably achieve the effects of the present invention.

The amount of the vulcanization accelerator, if present, per 100 parts by mass of the rubber component is preferably 1 part by mass or more, more preferably 2 parts by mass or more, but is preferably 10 parts by mass or less, more preferably 7 parts by mass or less. When the amount is within the range indicated above, the effects of the present invention tend to be well achieved.

The rubber composition may contain additives commonly used in the tire industry, in addition to the above-mentioned components. Examples of the additives include processing aids such as plasticizers and lubricants; and vulcanizing agents other than sulfur, e.g., organic crosslinking agents and organic peroxides.

The rubber composition according to the present invention may be prepared by common methods. Specifically, it may be prepared by kneading the components using a kneading machine such as a Banbury mixer, a kneader, or an open roll mill, and vulcanizing the kneaded mixture. Since the tetrazine compound used in the present invention is expected to interact with a reinforcing filler (particularly carbon black or silica) and also to contribute to the dispersibility of the reinforcing filler, the tetrazine compound is preferably kneaded with the rubber component (particularly SBR having a styrene content of 23% by mass or higher) so that the tetrazine compound is dispersed in the rubber component before or simultaneously with mixing the reinforcing filler (particularly carbon black or silica).

In order to cause a sufficient reaction between the SBR having a styrene content of 23% by mass or higher and the tetrazine compound, it is preferred to knead the SBR having a styrene content of 23% by mass or higher with the tetrazine compound to prepare a masterbatch, and then knead the masterbatch with silica. In other words, the pneumatic tire of the present invention is preferably produced by a method including the steps of: preparing a masterbatch by kneading the SBR having a styrene content of 23% by mass or higher with the tetrazine compound; and kneading the masterbatch obtained in the masterbatch preparation step with silica. In this method, the amount of the SBR having a styrene content of 23% by mass or higher based on 100% by mass of the rubber component kneaded in the masterbatch preparation step is preferably 60% by mass or more, more preferably 80% by mass or more, still more preferably 90% by mass or more, most preferably 100% by mass (i.e., the rubber component kneaded in the masterbatch preparation step consists only of the SBR having a styrene content of 23% by mass or higher) to cause a sufficient reaction between the SBR having a styrene content of 23% by mass or higher and the tetrazine compound to more suitably achieve the effects of the present invention. Moreover, to more suitably achieve the effects of the present invention, the masterbatch preparation step preferably excludes the kneading of silica, and the amount of the silica kneaded in the masterbatch preparation step per 100 parts by mass of the rubber component kneaded in the masterbatch preparation step is preferably 5 parts by mass or less, more preferably 3 parts by mass or less, still more preferably 1 part by mass or less, particularly preferably 0.5 parts by mass or less, most preferably 0 parts by mass. Moreover, to more suitably achieve the effects of the present invention, the amount of the tetrazine compound kneaded in the masterbatch preparation step per 100 parts by mass of the rubber component kneaded in the masterbatch preparation step is 0.1 parts by mass or more, preferably 0.5 parts by mass or more, more preferably 0.8 parts by mass or more, but is 3.0 parts by mass or less, preferably 2.5 parts by mass or less, more preferably 1.5 parts by mass or less.

The kneading conditions are as follows. When additives other than vulcanizing agents and vulcanization accelerators are compounded, the kneading temperature is usually 50 to 200° C., preferably 80 to 190° C., and the kneading time is usually 30 seconds to 30 minutes, preferably 1 to 30 minutes.

When vulcanizing agents and vulcanization accelerators are compounded, the kneading temperature is usually 100° C. or lower, preferably from room temperature to 80° C. Then, the composition containing a vulcanizing agent(s) and/or vulcanization accelerator(s) is usually vulcanized by press vulcanization, for example. The vulcanization temperature is usually 120 to 200° C., preferably 140 to 180° C.

The pneumatic tire of the present invention can be produced using the rubber composition by usual methods.

Specifically, the unvulcanized rubber composition containing the components may be extruded into the shape of a tire component such as a tread and assembled with other tire components on a tire building machine in a usual manner to build an unvulcanized tire, which may then be heated and pressurized in a vulcanizer to produce a tire.

The pneumatic tire of the present invention may be suitably used as a tire for passenger vehicles, large passenger vehicles, large SUVs, heavy load vehicles such as trucks and buses, light trucks, or two-wheeled vehicles, or as a run-flat tire.

EXAMPLES

The present invention is specifically described with reference to examples, but the present invention is not limited to the examples.

The chemicals used in the examples and comparative examples are listed below.

SBR (1): styrene-butadiene rubber (styrene content: 40% by mass, vinyl content: 15% by mass, Mw: 1,200,000)

SBR (2): styrene-butadiene rubber (styrene content: 20% by mass, vinyl content: 50% by mass, Mw: 300,000)

BR: high-cis BR (cis content: 97% by mass), Mw: 400,000)

Carbon black: SHOBLACK N220 (N220, $N_2SA$: 111 $m^2/g$) available from Cabot Japan K.K.

Silica: Ultrasil VN3 ($N_2SA$: 175 $m^2/g$) available from Degussa

Silane coupling agent: NXT (3-octanoylthio-1-propyltriethoxysilane) available from Momentive Tetrazine compound A: a compound of formula (1-1-1)
Tetrazine compound B: a compound of formula (1-2-1)
Tetrazine compound C: a compound of formula (1-3-1)
Tetrazine compound D: a compound of formula (1-4-1)

Oil: Diana Process P523 available from Idemitsu Kosan Co., Ltd.

Resin (1): terpene resin (softening point: 100° C., Mw: 900, SP value: 8.2)

Resin (2): a copolymer of α-methylstyrene and styrene (softening point: 85° C., Mw: 700, SP value: 9.1)

Resin (3): acrylic resin (softening point: 90° C., Mw: 1000, SP value: 10.0)

Stearic acid: stearic acid "TSUBAKI" available from NOF Corporation

Zinc oxide: Zinc oxide #1 available from Mitsui Mining & Smelting Co., Ltd.

Antioxidant: OZONONE 6C (N-(1,3-dimethylbutyl)-N'-phenyl-p-phenylenediamine) available from Seiko Chemical Co., Ltd.

Wax: Ozoace 0355 available from Nippon Seiro Co., Ltd.

Sulfur: powdered sulfur available from Tsurumi Chemical Industry Co., Ltd.

Vulcanization accelerator 1: NOCCELER NS (N-tert-butyl-2-benzothiazolylsulfenamide) available from Ouchi Shinko Chemical Industrial Co., Ltd.

Vulcanization accelerator 2: NOCCELER D (diphenylguanidine) available from Ouchi Shinko Chemical Industrial Co., Ltd.

Examples and Comparative Examples

The materials in the amounts shown in Table 1 were kneaded to prepare an unvulcanized rubber composition. The unvulcanized rubber composition was formed into a tread shape and then assembled with other tire components to build an unvulcanized tire, which was then pressurized and heated to prepare a test tire (size: 195/65R15). The test tires prepared as above were evaluated as described below. Table 1 shows the results.

(Silica Dispersion)

Test specimens were cut out of the rubber pieces collected from the tread of each example. The number of silica aggregates in the test specimens was counted in accordance with JIS K 6812 "Method for the assessment of the degree of pigment or carbon black dispersion in polyolefin pipes, fittings and compounds" to calculate the degree of dispersion (%). The degree of silica dispersion of each formulation example is expressed as an index, with Comparative Example 1 set equal to 100. A higher silica dispersion index indicates higher and better dispersion of silica.

(Fuel Economy)

The rolling resistance of the test tires mounted on a rim (15×6JJ) and run at an internal pressure of 230 kPa, a load of 3.43 kN, and a speed of 80 km/h was measured using a rolling resistance tester and expressed as an index (fuel economy index), with Comparative Example 1 set equal to 100. A higher index indicates better fuel economy.

(Abrasion Resistance)

The test tires of each example were mounted on a front-engine, front-wheel-drive car made in Japan. After running 8000 km, the groove depth in the tire tread portion was measured. A distance that caused a 1 mm decrease in tire groove depth was calculated and expressed as an index (abrasion resistance index), with Comparative Example 1 set equal to 100. A higher index means that a longer distance is required to cause a 1 mm decrease in tire groove depth, indicating better abrasion resistance.

(Wet Grip Performance)

The test tire of each example was mounted on each wheel of a car (front-engine, front-wheel-drive car of 2000 cc displacement made in Japan). The braking distance of the car with an initial speed of 100 km/h under wet asphalt conditions was determined and expressed as an index (wet grip performance index), with the reference example set equal to 100. A higher index indicates a shorter braking distance and better wet grip performance.

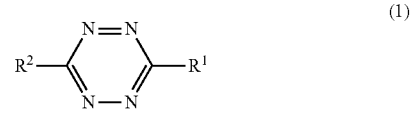

(1)

wherein $R^1$ and $R^2$ may be the same or different and each represent a hydrogen atom, —$COOR^3$ in which $R^3$ represents either a hydrogen atom or an alkyl group, or a C1-C11 monovalent hydrocarbon group optionally containing a heteroatom, and $R^1$ and $R^2$ may each form a salt;

TABLE 1

|  |  | Example |  |  |  |  |  | Comparative Example |  |  |  |  |  |
|---|---|---|---|---|---|---|---|---|---|---|---|---|---|
|  |  | 1 | 2 | 3 | 4 | 5 | 6 | 1 | 2 | 3 | 4 | 5 | 6 |
| Amount (parts by mass) | SBR (1) | 80 | 80 | 80 | 80 | 80 | 80 | 80 | 80 | 80 | 80 | — | — |
|  | SBR (2) | — | — | — | — | — | — | — | — | — | — | 80 | 80 |
|  | BR | 20 | 20 | 20 | 20 | 20 | 20 | 20 | 20 | 20 | 20 | 20 | 20 |
|  | Carbon black | 5.0 | 5.0 | 5.0 | 5.0 | 5.0 | 5.0 | 5.0 | 5.0 | 5.0 | 5.0 | 5.0 | 5.0 |
|  | Silica | 100 | 100 | 100 | 100 | 100 | 100 | 100 | 150 | 50 | 100 | 150 | 150 |
|  | Silane coupling agent | 8.0 | 8.0 | 8.0 | 8.0 | 8.0 | 8.0 | 8.0 | 12.0 | 8.0 | 8.0 | 12.0 | 12.0 |
|  | Tetrazine compound A | 1.0 | 1.0 | 1.0 | — | — | — | — | — | 1.0 | 4.0 | 1.0 | — |
|  | Tetrazine compound B | — | — | — | 1.0 | — | — | — | — | — | — | — | — |
|  | Tetrazine compound C | — | — | — | — | 1.0 | — | — | — | — | — | — | — |
|  | Tetrazine compound D | — | — | — | — | — | 1.0 | — | — | — | — | — | — |
|  | Oil | — | — | — | — | — | — | 20 | 20 | 20 | 20 | 20 | 20 |
|  | Resin (1) | 20 | — | — | 20 | 20 | 20 | — | — | — | — | — | — |
|  | Resin (2) | — | 20 | — | — | — | — | — | — | — | — | — | — |
|  | Resin (3) | — | — | 20 | — | — | — | — | — | — | — | — | — |
|  | Stearic acid | 2.0 | 2.0 | 2.0 | 2.0 | 2.0 | 2.0 | 2.0 | 2.0 | 2.0 | 2.0 | 2.0 | 2.0 |
|  | Zinc oxide | 3.0 | 3.0 | 3.0 | 3.0 | 3.0 | 3.0 | 3.0 | 3.0 | 3.0 | 3.0 | 3.0 | 3.0 |
|  | Antioxidant | 2.0 | 2.0 | 2.0 | 2.0 | 2.0 | 2.0 | 2.0 | 2.0 | 2.0 | 2.0 | 2.0 | 2.0 |
|  | Wax | 2.0 | 2.0 | 2.0 | 2.0 | 2.0 | 2.0 | 2.0 | 2.0 | 2.0 | 2.0 | 2.0 | 2.0 |
|  | Sulfur | 1.5 | 1.5 | 1.5 | 1.5 | 1.5 | 1.5 | 1.5 | 1.5 | 1.5 | 1.5 | 1.5 | 1.5 |
|  | Vulcanization accelerator (1) | 1.5 | 1.5 | 1.5 | 1.5 | 1.5 | 1.5 | 1.5 | 1.5 | 1.5 | 1.5 | 1.5 | 1.5 |
|  | Vulcanization accelerator (2) | 1.0 | 1.0 | 1.0 | 1.0 | 1.0 | 1.0 | 1.0 | 1.0 | 1.0 | 1.0 | 1.0 | 1.0 |
| Evaluation results | Silica dispersion index | 110 | 110 | 110 | 105 | 105 | 110 | 100 | 90 | 110 | 110 | 110 | 100 |
|  | Fuel economy index (a) | 110 | 110 | 110 | 105 | 105 | 110 | 100 | 90 | 110 | 110 | 110 | 100 |
|  | Abrasion resistance index (b) | 100 | 100 | 100 | 100 | 100 | 100 | 100 | 90 | 100 | 90 | 95 | 95 |
|  | Wet grip performance index (c) | 105 | 110 | 105 | 105 | 105 | 110 | 100 | 120 | 90 | 90 | 95 | 100 |
|  | Total of indices (a) to (c) | 315 | 320 | 315 | 310 | 310 | 320 | 300 | 300 | 300 | 290 | 300 | 295 |

As shown in Table 1, a balanced improvement in fuel economy, abrasion resistance, and wet grip performance was achieved in the pneumatic tires of the examples including a tread containing a tread rubber composition which contained a rubber component including 30% by mass or more of a styrene-butadiene rubber and contained, per 100 parts by mass of the rubber component, 80 to 150 parts by mass of silica, 0.1 to 3.0 parts by mass of a tetrazine compound of formula (1), and 50 parts by mass or less of a hydrocarbon resin having a SP value of 7.5 to 10.5 and in which the styrene-butadiene rubber had a styrene content of 23% by mass or higher.

The invention claimed is:

1. A pneumatic tire, including a tread comprising a tread rubber composition, the tread rubber composition comprising:

a rubber component comprising a modified styrene-butadiene rubber, isoprene-based rubber and a polybutadiene rubber;

a silica;

a tetrazine compound represented by the following formula (1):

a hydrocarbon resin having a softening point of 120° C. or lower; and a plant oil, the tread rubber composition comprising 30 to 85% by mass of the modified styrene-butadiene rubber and 5 to 30% by mass of the polybutadiene rubber, based on 100% by mass of the rubber component, the tread rubber composition comprising, per 100 parts by mass of the rubber component:

80 to 150 parts by mass of the silica;

0.1 to 3.0 parts by mass of the tetrazine compound; and one part by mass or more of the hydrocarbon resin, and the modified styrene-butadiene rubber having a styrene content of 23% by mass or higher and a vinyl content of 30% by mass or lower, wherein, per 100 parts by mass of the rubber component, the amount of a reinforcing filler is 80 parts by mass or more and the amount of carbon black is 10 parts by mass or less.

2. The pneumatic tire according to claim 1, wherein the tetrazine compound is a compound represented by the following formula (1-1), (1-2), (1-3), or (1-4):

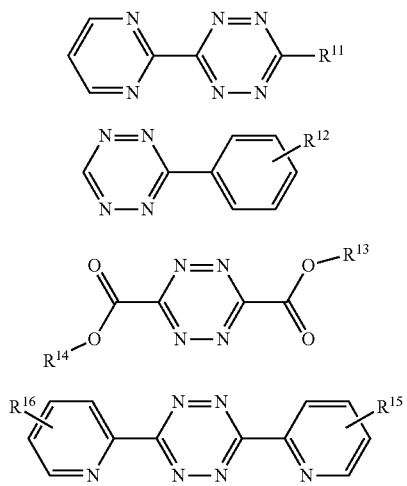

(1-1)
(1-2)
(1-3)
(1-4)

wherein
in formula (1-1), $R^{11}$ represents a hydrogen atom, —$COOR^{17}$ in which $R^{17}$ represents either a hydrogen atom or an alkyl group, or a C1-C11 monovalent hydrocarbon group optionally containing a heteroatom, and $R^{11}$ may form a salt;
in formula (1-2), $R^{12}$ represents a functional group having at least one atom selected from the group consisting of nitrogen, oxygen, sulfur, fluorine, and silicon atoms, and $R^{12}$ may form a salt;
in formula (1-3), $R^{13}$ and $R^{14}$ may be the same or different and each represent a hydrogen atom or an alkyl group, and $R^{13}$ and $R^{14}$ may each form a salt; and
in formula (1-4), $R^{15}$ and $R^{16}$ may be the same or different and each represent a hydrogen atom, —$COOR^{18}$ in which $R^{18}$ represents either a hydrogen atom or an alkyl group, or a functional group having at least one atom selected from the group consisting of nitrogen, oxygen, sulfur, fluorine, and silicon atoms, and $R^{15}$ and $R^{16}$ may each form a salt.

3. The pneumatic tire according to claim 1, wherein the tetrazine compound is a compound represented by the following formula (1-1-1), (1-1-2), (1-2-1), (1-3-1), (1-4-1), or (1-4-2):

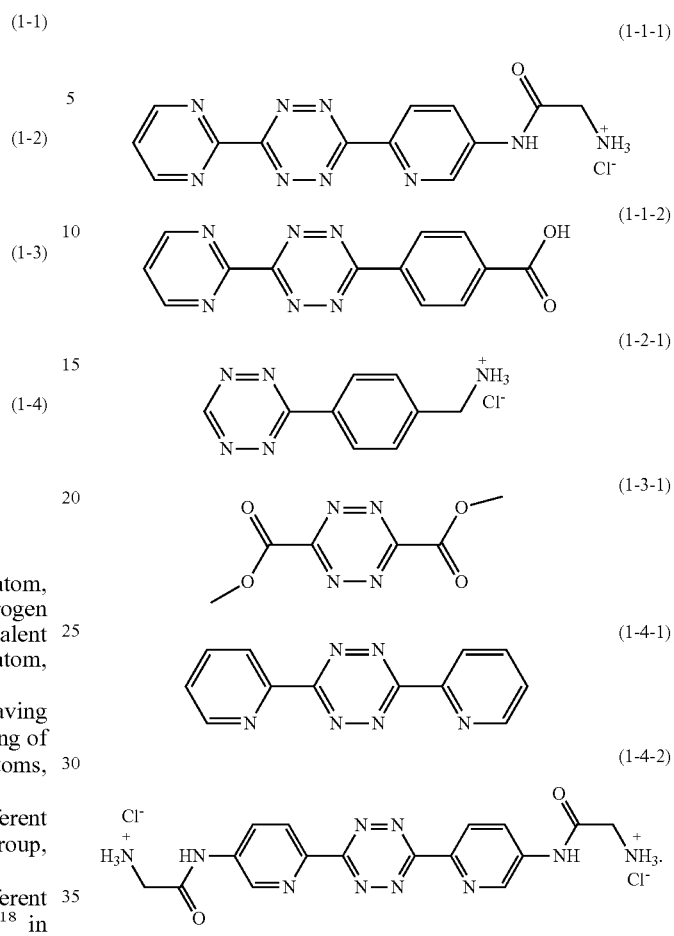

(1-1-1)
(1-1-2)
(1-2-1)
(1-3-1)
(1-4-1)
(1-4-2)

4. The pneumatic tire according to claim 1, wherein the hydrocarbon resin has a weight average molecular weight of 300 to 1400.

5. The pneumatic tire according to claim 1, wherein the hydrocarbon resin is a styrene resin.

* * * * *